Sept. 29, 1964  C. VAN DER LELY  3,150,721
RESILIENT MOUNTING MEANS FOR A ROTATING TOOL
Filed April 19, 1961  3 Sheets-Sheet 1

INVENTOR.
CORNELIS VAN DER LELY
BY
Mason, Mason & Albright
ATTORNEYS

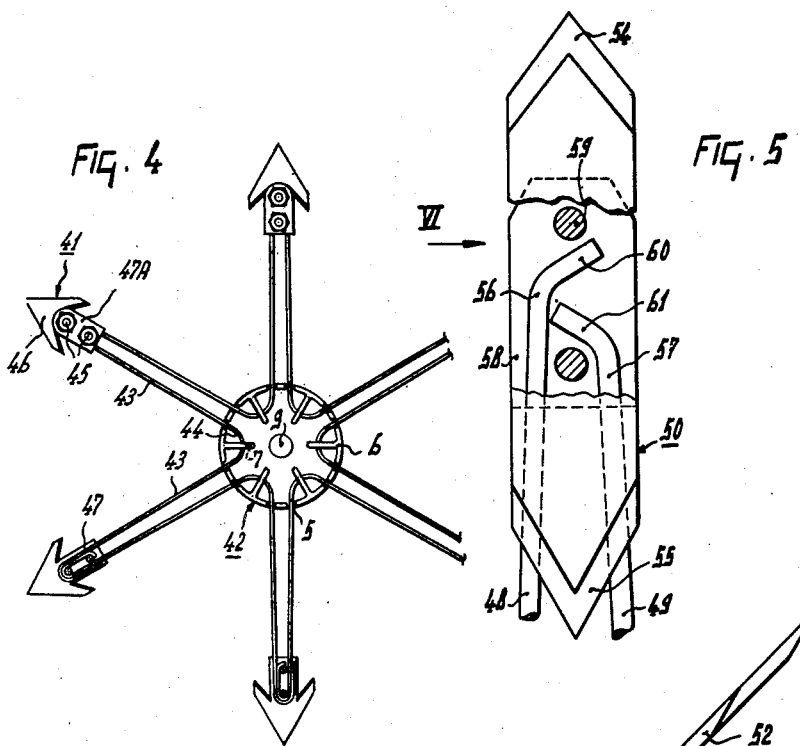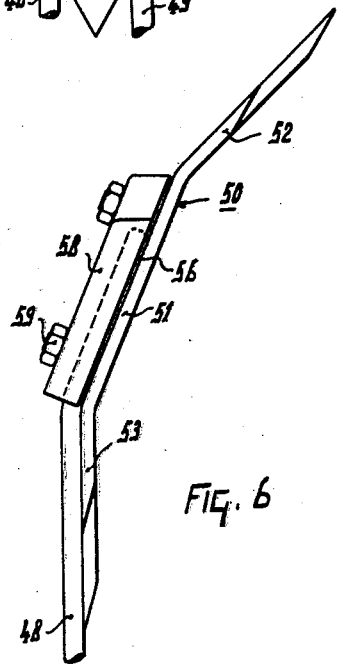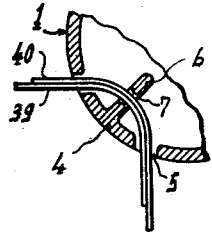

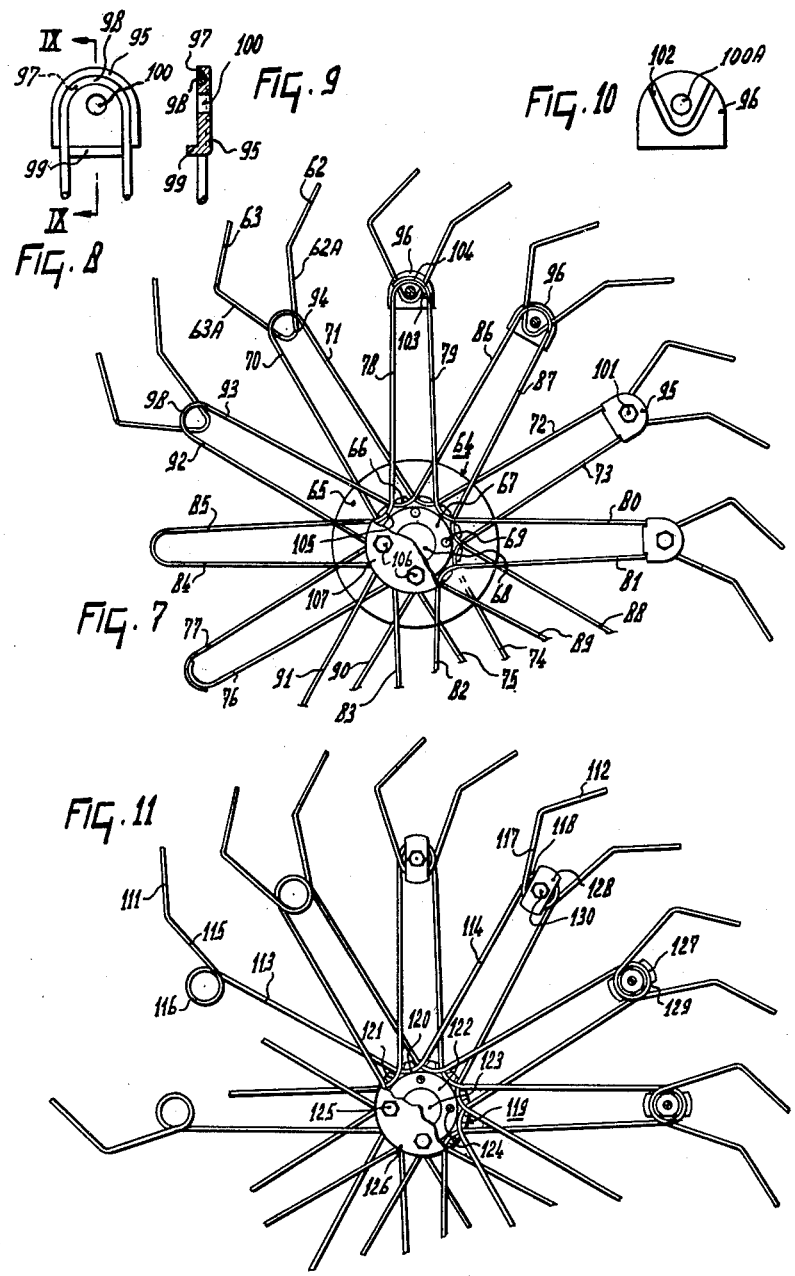

United States Patent Office 3,150,721
Patented Sept. 29, 1964

3,150,721
RESILIENT MOUNTING MEANS FOR A
ROTATING TOOL
Cornelis van der Lely, Zug, Switzerland, assignor to
C. van der Lely N.V., Maasland, Netherlands, a company of the Netherlands
Filed Apr. 19, 1961, Ser. No. 104,069
Claims priority, application Netherlands May 4, 1960
7 Claims. (Cl. 172—544)

This invention relates to ground- or crop-working members of the kind intended to form part of a ground- or crop-working agricultural implement, each such member or wheel being adapted to be rotatably mounted on an implement and comprising circumferentially arranged parts for working the ground or crop.

It is an object of the invention to provide ground- and crop-working members of simple construction in which the parts for working the ground or crop are capable of deflecting, during operation of the members, to avoid obstacles which would otherwise tend to damage or break them.

According to the present invention there is provided a member of the kind set forth, wherein work engaging parts for working the crop or ground are connected to a central portion of the member by spoke-shaped elements which are connected to elongated torsionally-deformable elements in such a way that, during operation of the member, the spoke-shaped elements are capable of performing deflecting movements in directions extending substantially parallel to the axis of rotation of the member, the elongated torsionally-deformable elements being connected to the central portion and acting to oppose such deflecting movements.

Figure 1:
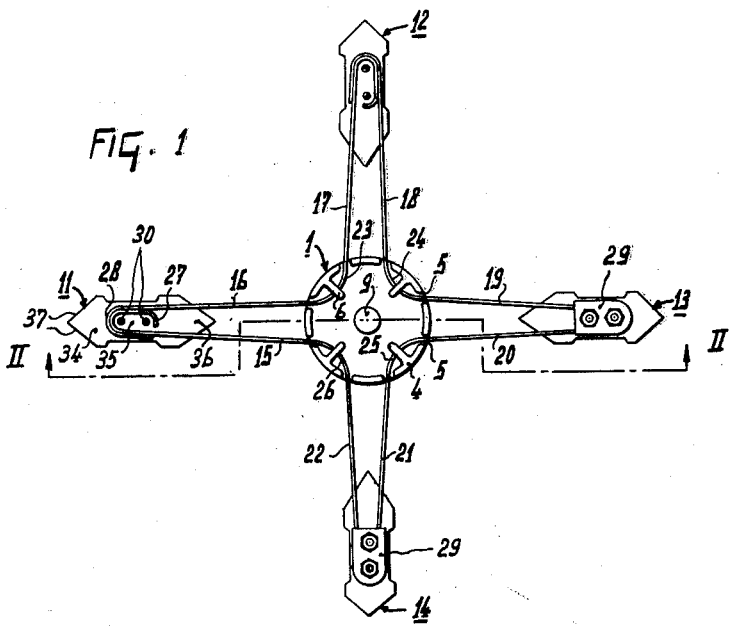
Figure 2:
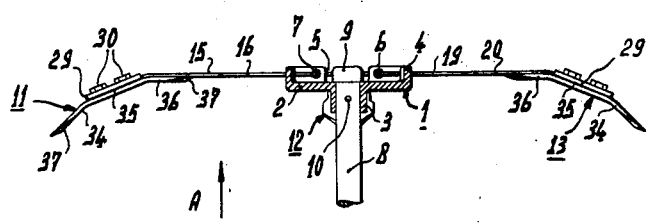

For a better understanding of the invention and to show how the same may be carried into effect reference will now be made, by way of example, to the accompanying drawings, in which:

FIGURE 1 is an elevation of a cultivating member in accordance with the invention, FIGURE 2 is a section on the line II—II of FIGURE 1, FIGURE 3 is a detailed view, partly broken away and partly in section and to an enlarged scale, showing a modification of part of the cultivating member of FIGURES 1 and 2, FIGURE 4 is an elevation of an alternative embodiment of a cultivating member in accordance with the invention, FIGURE 5 is an elevation, partly in section and to an enlarged scale, showing parts of a further alternative embodiment of a cultivating member in accordance with the invention, FIGURE 6 is a view in the direction indicated by the arrow VI of FIGURE 5, FIGURE 7 is an elevational view of part of a rake wheel in accordance with the invention, FIGURE 8 is an elevation, to an enlarged scale, showing parts of the rake wheel of FIGURE 7 in greater detail, FIGURE 9 is a section on the line IX—IX of FIGURE 8, FIGURE 10 is an elevation showing a further part of the rake wheel of FIGURE 7 in greater detail, and FIGURE 11 is a view similar to FIGURE 7 showing an alternative form of rake wheel in accordance with the invention.

Referring to FIGURES 1 and 2 of the drawings, the cultivating member or wheel has a central portion 1 which is comprised by a hub 3, a flange 2 and a rim 4 in which latter eight recesses 5 are formed, the recesses 5 being spaced from one another around the axis of a shaft 8 to which the cultivating member is secured. The shaft 8 is provided with a head 9 of enlarged diameter, one end of the hub 3 bearing against the head 9. A pin 10 is entered in a transverse bore formed in the shaft 8 at a short distance from the head 9 and also through aligned holes in the wall of the hub 3. The cultivating member is thus substantially rigidly secured to the shaft 8 which latter forms part of a ground-working agricultural implement such, for example, as a rotary cultivator.

The rim 4 is integral with four projections 6 which extend radially with respect to the axis of the shaft 8 and which are spaced at 90° intervals there-around. Each projection 6 is formed with a bearing hole 7.

The cultivating member includes four parts for working the ground in the form of plate-shaped soil-tilling members 11, 12, 13 and 14 which are connected to the central portion 1 by means of eight spoke-shaped elements 15 to 22, there being two such elements provided in respect of each of the four soil-tilling members. The spoke-shaped elements 15 to 22 are formed in integral pairs from single lengths of spring steel wire, each pair of elements being interconnected by an integral curved portion. Thus, the pairs of elements 16 and 17, 18 and 19, 20 and 21, and 22 and 15 are interconnected by curved portions 23, 24, 25 and 26 respectively. The elements of each pair are inclined to one another at an angle very slightly in excess of 90°.

The center of each of the four curved portions 23 to 26 passes through a corresponding one of the bearing holes 7 while the opposite ends of each curved portion are entered in corresponding ones of the recesses 5 formed in the rim 4. The free ends of the spoke-shaped elements are bent and have the soil-tilling members 11 to 14 secured to them. Since the arrangement is the same in respect to each soil-tilling member, it will be described in detail only in respect of the soil-tilling member 11. The free end of the element 15 is bent into a closed or nearly closed loop 27 and the free end of the element 16 is formed with an approximately 180° bend 28 and is so arranged that it lies around the loop 27 in the same plane as the latter. The said free ends are clamped between the body of the member 11 and a plate 29 (FIGURE 2) by means of a pair of bolts 30 which pass through aligned holes in the member just mentioned and also through the closed or nearly closed loop 27.

The plate 29 is formed with shallow grooves shaped to receive the loops 27 and 28. This arrangement tends to prevent the member 11 becoming displaced relative to the free ends of the elements 15 and 16. However, the depth of the grooves is considerably less than the thickness of the elements so that the latter can still be firmly clamped between the member 11 and plate 29, the clamping location being close to the periphery of the cultivating member.

As can be seen in FIGURE 2, each of the soil-tilling members 11 to 14 includes three relatively inclined portions 34, 35 and 36. The angles by which the portions 34 and 36 are inclined to the portion 35 are equal to one another and also substantially equal to the angle by which the plane containing the free ends of the elements 15 and 16 and including the loop 27 and bend 28 is inclined to the plane containing the greater parts of the elements 15 and 16. The bolts 30 act to clamp the loop 27 and bend 28 between the plate 29 and the central portion 35 of the members 11 so that the radially innermost portion 36 lies parallel to and in abutting engagement with a part of each of the elements 15 and 16. The portion 34, on the other hand, extends beyond the free ends of the elements 15 and 16 and is disposed radially outermost with respect to the shaft 8. In the embodiment illustrated, the portions 34 and 36 are similarly blade-shaped, both of them tapering towards the ends thereof remote from the central portion 35. Both the tapering sides of each of the two portions 34 and 36 are provided with cutting edges 37, these edges facilitating the passage of the soil-tilling members through the ground.

During operation of a cultivating implement incorporating cultivating members of the kind shown in FIGURES 1 and 2, the direction of travel of the implement will preferably be such that the component of the resistance to passage of the soil-tilling members through the ground which extends parallel to the shaft 8 acts in the direction indicated by the arrow A in FIGURE 2. When a force acts on the soil-tilling member 11 in this direction, the elements 15 and 16 tend to deflect in the direction A, that is to say, substantially parallel to the axis of rotation of the member. In view of the fact that the curved portions 23 and 26 are only loosely entered in the bearing holes 7, the elements 22 and 17 with which the elements 15 and 16 are integrally connected and which extend in opposite directions very nearly perpendicular thereto, tend to turn about their own longitudinal axes. However, this is prevented by virtue of the fact that the elements 17 and 22 are not only supported by the projections 6 but also bear against the walls of the corresponding recesses 5. In addition, their free ends are clamped to the members 12 and 14 in an identical manner to that described in connection with the member 11. The arrangement is such that, in fact, the elongated elements 17 and 22 are torsionally deformed upon movement of the member 11 in the direction indicated by the arrow A in FIGURE 2. It will be clear from the drawings that two elements are torsionally deformed in a manner similar to that just described when any one of the members 11 to 14 is moved in the direction A. The arrangement is such that the members 11 to 14 are capable of substantial deflection only in the direction A and in the reverse direction. When a pair of elongated spoke-shaped elements, such as the elements 17 and 22, are torsionally deformed by movement of one of the members, such as the member 11, in the direction A, the members, such as 12 and 14, to which the free ends of these elements are secured, are turned angularly through several degrees about an imaginary axis extending substantially perpendicular to the shaft 8 and passing through that shaft and through the two members, such as 12 and 14, concerned. The two members are disposed substantially parallel to, and substantially symmetrical to, this axis. It will be realized that the members just mentioned are themselves out of contact with the ground at such times. It has been found that the turning or twisting movement just described tends to shake off soil or other material adhering to the members.

The cultivating member described may be used in a rotary cultivator or like implement in which the cultivating members are caused to rotate by the engagement of their peripheries with the ground or, alternatively, in implements in which the cultivating members are power driven. As previously stated, the cultivating members are preferably arranged so that, viewed in the direction of travel of the implement of which they form a part, the blade-shaped portions 34 of the soil-tilling members 11 to 14 project forwardly. If the portions 34 become damaged or worn out, the soil-tilling members may be detached from the corresponding elements and remounted thereon in new positions in which the portions 36 project beyond the free ends of the elements. If desired, the portions 34 and 36 may be of different formation so that either one of two different soil-tilling actions may be selected by appropriate mounting of the soil-tilling members. The simple means by which the soil-tilling members 11 to 14 are mounted at the free ends of the spoke-shaped elements allows the members to be readily removed from and remounted upon the cultivating members.

FIGURE 3 shows part of the central portion 1 of a cultivating member similar to that shown in FIGURES 1 and 2. However, in this case, the spoke-shaped elements are formed as two single lengths of spring steel wire 39 and 40 which extend alongside one another through the recesses 5 and bearing hole 7. The arrangement is otherwise similar to that described with reference to FIGURES 1 and 2. The free ends of the spoke-shaped elements 39 and 40 are both connected to the same soil-tilling members.

FIGURE 4 shows a cultivating member which is generally similar to that described with references to FIGURES 1 and 2 but which, in this case, includes six soil-tilling members 41. The cultivating member has a central portion 42 which is generally similar in construction to the central portion 1 previously described but which, naturally, is provided with a correspondingly greater number of recesses 5 and projections 6. Each soil-tilling member 41 is connected to the central portion 42 by means of a pair of spoke-shaped elements 43 formed from spring steel wire. As in the previous case, two elements 43 are integrally connected by a curved portion 44 which passes through a bearing hole 7 formed in a corresponding one of the projections 6. However, in this case, the two elements of each pair are not inclined to one another at approximately 90° but at an angle of approximately 60°. Each soil-tilling member 41 is comprised by an arrow head shaped blade 46 and an integral rectangular portion 47, the member 41 being clamped to the free ends of two elements 43 by means of a plate 47A and a pair of bolts 45 corresponding to the plate 29 and bolts 30 previously described. The free ends of the two elements 43 are formed as a closed or nearly closed loop and as a 180° bend in the manner previously described, the two bolts 45 passing through the said loop. The blades 46 are preferably inclined to the plane containing all the elements 43 in such a way that they project forwardly with respect to the intended direction of travel of the implement of which the cultivating member forms a part.

Each spoke-shaped element 43 not only connects a corresponding soil-tilling member 41 with the central portion 42 but also acts as an elongated torsionally deformable element arranged to oppose movement of a neighboring member 41 in a direction parallel to the shaft 8. Due to the fact that the elements 43 of each integral pair are inclined to one another at angles of 60°, a force tending to torsionally deform element 43 tends also to bend the element to a certain extent. However, the resiliency of the spring steel wire of which the elements 43 are made is sufficient to prevent permanent deformation of the elements taking place.

FIGURES 5 and 6 show an alternative embodiment of a soil-tilling member, generally indicated by the reference numeral 50, and its means of connection to the free ends of two spoke-shaped elements 48 and 49. The member 50 is formed from a length of strip-shaped material and is bent in such a way that it has three mutually inclined portions 51, 52 and 53. The free ends of the blade-shaped portions 52 and 53 taper to points and are formed with cutting edges 54 and 55, respectively. The free ends 56 and 57 of the elements 48 and 49 lie in a plane disposed at an angle to the plane containing the greater parts of the elements 48 and 49 which angle is the same as the angle by which the central portion 51 of the member 50 is inclined to both the portions 52 and 53 thereof. The member 50 is clamped to the free ends 56 and 57 by means of a plate 58 and a pair of bolts 59, the arrangement being such that the central portion 51 of the member 50 bears against the free ends 56 and 57 whereas the portion 53 lies against further parts of the elements 48 and 49.

The free ends 56 and 57 include bent over portions 60 and 61, respectively, and the plate 58 is formed with a recess which receives the free ends 56 and 57 including the bent over portions 60 and 61. The depth of this recess is less than the thickness of the wire of which the elements 48 and 49 is composed so that the free ends 56 and 57 can be clamped tightly between the plate 58 and the member 50 which would not be possible if the depth of the recess were the same as, or greater than, the thickness of the wire.

It will be clear that the member 50 can be secured to the elements 48 and 49 so that either the blade-shaped portion 52 or the blade-shaped portion 53 extends radially outwardly beyond the free ends 56 and 57. As in the case of the soil-tilling member 11 previously described, the portions 52 and 53 may, if desired, be formed differently so that either of them can be selected for use in accordance with the conditions under which the corresponding implement is to work.

FIGURE 7 shows a rake wheel parts for working crop in the form of integral pairs of circumferentially mounted tines 62 and 63. The tines are supported by arms 62A and 63A, respectively, the arms being interconnected by a curved portion 94. The tines 62 and 63 are inclined rearwardly with respect to the intended direction of rotation of the rake wheel to facilitate the shedding of crop therefrom. The rake wheel has a central portion generally indicated by the reference numeral 64, the portion 64 including a circular plate 65 formed with a plurality of space projections 66. The plate 65 has a central hole 68 around which a flange 67 is provided, four holes 69 being formed through the flange at equally spaced intervals around the center of the wheel.

Spoke-shaped elements by which the tines 62 and 63 are connected to the central portion 64 are formed in groups from single lengths of spring steel wire. The elements 77 and 70 to 76 constitute a first group of elements made from a single length of spring steel wire, elements 89 to 93 and 86 to 88 constitute a second group of elements formed from a single length of spring steel wire and elements 79 to 85 and 78 constitute a third group of elements formed from a single length of spring steel wire.

Each element is connected to the next element in the corresponding group at the location of the central portion 64 by means of a curved portion 105. Each curved portion 105 passes between a corresponding one of the projections 66 and the side of the flange 67. The three groups of elements are mounted on after the other upon the central portion 64. The first group bears directly against the plate 65 whereas the second group bears against the first group and the third group, in turn, bears against the second group. Finally, a plate 107 of greater diameter than the flange 67 is bolted to the latter by means of four bolts 106 which pass through the four holes 69. Thus, the plate 106 bears against the third group. The height of the projections 66 is substantially identical to the height of the flange 67 and thus the three groups of elements are maintained in position between the plates 65 and 107, the curved portions 105 being, however, only loosely entered in the recesses formed between neighboring projections 66.

Each bend 105 is of approximately 90° so that adjoining elements in each group extend at approximately 90° to one another. Each pair of tines 62 and 63 is connected to a corresponding pair of elements of one of the groups at a location at the periphery of the rake wheel, at which location the two elements are interconnected by a bend 98 of approximately 180°. Each pair of tines 62 and 63 is clamped to a corresponding one of the bends 98 by means of two plates 95 and 96. The plate 95 (see FIGURES 8 and 9) is formed with a groove 97 shaped to receive the bend 98 and has a rim 99 along one edge, the rim 99 being arranged to abut against the corresponding edge of the plate 96 and to have its opposite ends in engagement with the two elements integral with the corresponding bend 98. Thus, the rim 99 prevents any substantial relative movements from taking place between the various parts just mentioned. The plate 96 is formed with a groove 102 shaped to receive the bend 94 connecting the pair of tines 62 and 63. The plates 95 and 96 have holes 100 and 100A, respectively, through which holes a bolt 101 (FIGURE 7) is passed to clamp the various parts rigidly to one another.

The opposite ends of each of the three groups of elements are also clamped to each other by a pair of plates of the kind just described. Thus, as can be seen in FIGURE 7, the opposite ends of the third group of elements are formed by curved portions 103 and 104 which lie alongside one another in place of one of the integral curves 98 previously described. A plate (not shown) similar to the plate 95 previously described is provided to co-operate with the plate 96 at this location. The only difference which this plate has in comparison with the plate 95 is that the groove 97 is of greater width throughout the major part of its length in order to be able to receive the two curved portions 103 and 104 alongside one another.

The rake wheel is preferably arranged on a raking implacement in such a way that the component of the forces which, during operation, act on the rake wheel in a direction parallel to the axis of rotation thereof tend to bend the tines 62 and 63 in a direction away from the flange 65. The force tending to bend the tines 62 and 63 torsionally deforms the arms 62A and 63A. The spoke-shaped elements such as 78 and 79 are also deflectable in a direction substantially parallel to the direction of rotation of the rake wheel. The element 78 is integral with the element 85 and the element 79 is integral with the element 80 so that, in a similar manner to that described with reference to the cultivating member shown in FIGURES 1 and 2, deflection of the elements 78 and 79 involves torsional deformation of the elongated elements 80 and 85. Furthermore, the tines connected to the elements 80 and 85 are moved in such a way by torsional deformation of the elements 80 and 95 that any crop or other material adhering thereto tends to be shaken off.

FIGURE 11 shows an alternative embodiment of a rake wheel in which the tines are integral with the spoke-shaped elements. Two tines 111 and 112 are disposed at opposite ends of a single length of spring steel wire. The integral assembly also includes two spoke-shaped elements 113 and 114, a curved portion 120 extending through 90°, two aproximately 360° loops 116 and 118 and two supporting arms 115 and 117 for the tines 111 and 112, respectively. The arms 115 and 117 are equivalent to the arms 62A and 63A previously described. The curved portion 120 is entered between a projection 121 and a flange 122 forming part of a central portion 119 in a similar manner to that described in connection with FIGURE 7. The flange 122, which surrounds a central hole 123, is formed with four holes 124 for the reception of four bolts 125 by means of which a retaining plate 126 is secured to the flange 122. The curved portion 120 and the corresponding curved portion of each of the other integral assemblies is only loosely entered in the recesses between the projections 121.

The loops provided adjacent to two tines are clamped to one another by means of a pair of plates 127 and 128 disposed on opposite sides of the two loops. The plates are formed with grooves 129 shaped to receive the loops. Clamping is effected by means of a bolt 130 which passes through aligned holes in the two plates and through the centers of the two loops clamped therebetween.

As can be seen in FIGURE 11, each integral assembly is supported at the central portion 119 and at the locations of the two loops which it includes. In addition, it will be seen that the element 113 passes to one side of the elements of two other assemblies whereas the integral element 114 passes to the opposite side of two further elements. Thus, each element is supported by its neighbors in addition to being supported at the locations previously mentioned.

As in the previous cases, the tines 111 and 112 are inclined rearwardly with regard to the intended direction of rotation of the rake wheel and are movable in directions substantially parallel to the axis of rotation of the rake wheel by torsional deformation of the arms 115 and 117, which are inclined to the tines, and by deflection of the elements 113 and 114. Upon movement of the tine 111 in a direction parallel to the axis of rotation of the rake wheel, the elongated spoke-shaped element 114 is torsionally deformed whereas, upon movement of the tine 112 in the same direction, the element 113 is torsionally deformed. The arrangement is again such that any crop or other material adhering to the tines tends to be shaken off.

Although the members shown in FIGURES 7 and 11 have been described as rake wheels, they may also be employed as weeding wheels. In either case, the wheels may be rotated either by the contact of a lower region thereof with the ground or may be power driven.

The term "crop or ground" in the specification of the invention is intended to mean an agricultural implement which travels over the ground and performs treating operations in connection with farming.

The wheels described are readily manufactured and assembled and any part thereof which becomes worn or damaged can readily be replaced.

What we claim is:

1. A wheel for use in an agricultural implement adapted for rotation as the implement moves over the ground, said wheel having a central portion provided with a central axis, a plurality of spoke-shaped elements, each spoke-shaped element comprising at least a pair of outwardly extending arms, all of said arms being composed of a single strand of wire and connected with said central portion by means of an arcuate connecting portion thereof, said central portion having projecting means for retaining each of said connecting portions, a plurality of clamping means, a plurality of work-engaging means, each of said clamping means securing the outer ends of each of said pair of arms in fixed position to one of said work-engaging means in a position spaced from the periphery of said wheel and said central portion, each of said clamping means being independently supported by said pair of arms whereby each pair of arms is capable of movements in a direction extending substantially parallel to the axis of said central portion when the work-engaging means strikes an obstruction on the ground during the operation of said wheel.

2. The structure of claim 1 wherein said central portion is provided with a rim having recesses, said single strand of wire extending into said recesses.

3. The structure of claim 1 wherein each strand of wire has U-bends at its opposite ends, the bends at each end being secured by said clamping means.

4. The structure of claim 3 wherein the bend of one wire is contained within the bend of a second wire.

5. The structure of claim 1 wherein said work-engaging means comprises a blade-shaped portion, one end of said blade-shaped portion having tapered sides.

6. The structure of claim 1 wherein said work-engaging means comprises a blade-shaped portion having tapered sides at both ends thereof and means for adjusting said work-engaging means on each pair of arms whereby to present the tapered sides of either end of said blade-shaped portion in work-engaging position.

7. The structure of claim 1 wherein each of the engaging means is arrow-shaped and is provided with mutually inclined portions.

References Cited in the file of this patent

UNITED STATES PATENTS

| | | |
|---|---|---|
| 622,162 | Pattisson | Mar. 28, 1899 |
| 1,476,917 | Patitz | Dec. 11, 1923 |
| 2,503,474 | Dooley | Apr. 11, 1950 |
| 2,909,888 | Van der Lely et al. | Oct. 27, 1959 |
| 2,953,891 | Van der Lely et al. | Sept. 27, 1960 |

FOREIGN PATENTS

| | | |
|---|---|---|
| 43,171 | Denmark | Oct. 3, 1930 |
| 416,108 | Germany | July 9, 1925 |